Dec. 8, 1925.
S. B. WINN
TRACTOR
Filed Aug. 11, 1924
1,564,739
2 Sheets-Sheet 2
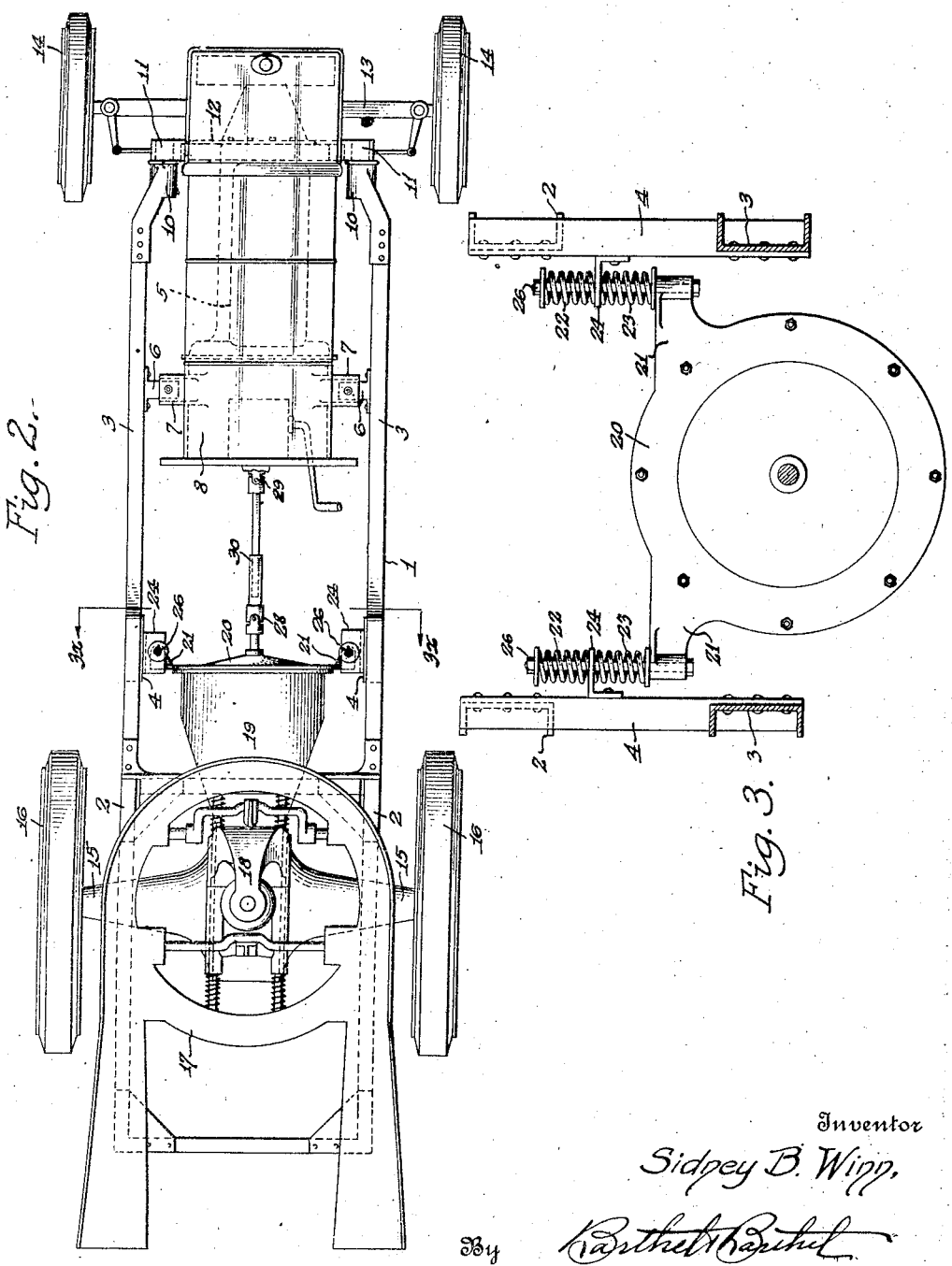
Inventor
Sidney B. Winn,
By
Attorneys Patented Dec. 8, 1925.

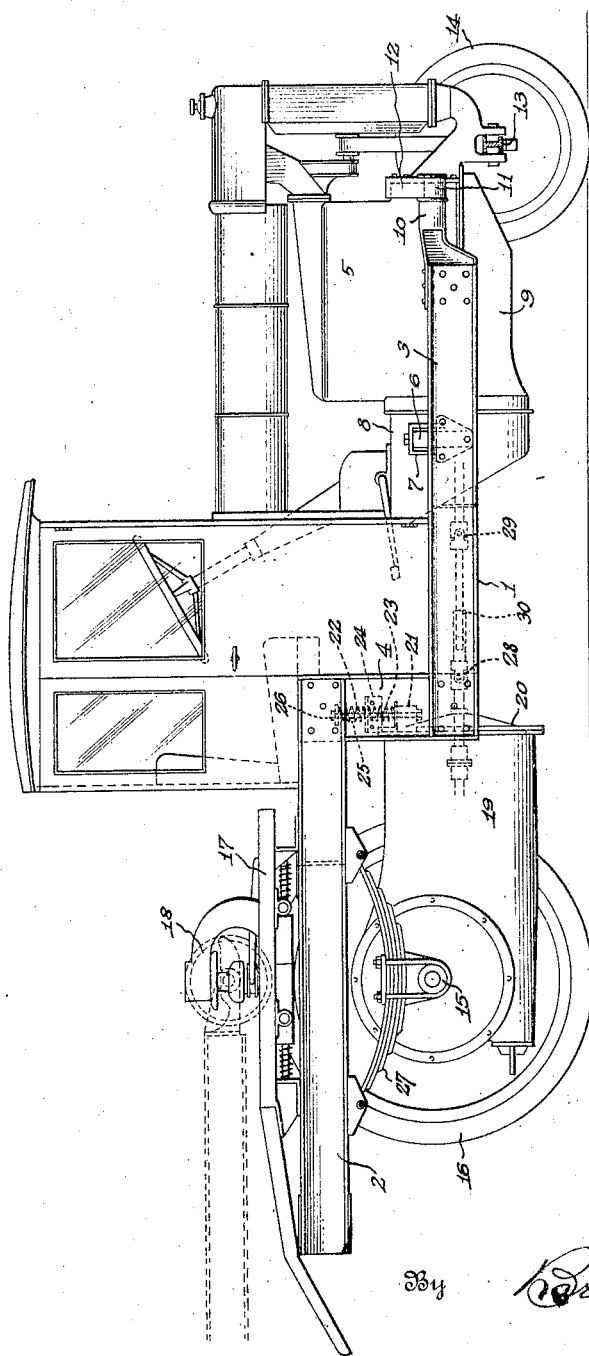

1,564,739

UNITED STATES PATENT OFFICE.

SIDNEY B. WINN, OF LAPEER, MICHIGAN.

TRACTOR.

Application filed August 11, 1924. Serial No. 731,351.

*To all whom it may concern:*

Be it known that I, SIDNEY B. WINN, a citizen of the United States, residing at Lapeer, in the county of Lapeer and State of Michigan, have invented certain new and useful Improvements in Tractors, of which the following is a specification, reference being had therein to the accompanying drawings.

This invention relates to motor haulage vehicles such as of the type generally known as tractors wherein, particularly under the progress restricting influence of heavy loads or trailers, a tendency towards the lifting of the front wheels of the vehicle from the ground is often very marked; and the object of this invention is to obtain greater stability in such vehicles.

The primary effort in all motor vehicles driven through the rear axle is to effect the rotation of the vehicle about the rear axle, the actual propulsion of the vehicle being secondary, and this tendency often manifests itself in transmission through the frame to the front axle and wheels, bringing about the undesirable lifting referred to. By my said invention, therefore, I propose to provide for the absorbing or damping of the force of such primary effort instead of its transmission through the frame to the wheels whereby the undesirable effect of the same will be overcome.

A further object is the provision of a novel combination of chassis frame and transmission housing adapted to accomplish the desired results; and a still further object is the securing of a novel combination of parts particularly adaptable for trailer use, embodying the said advantages.

Still further objects subsidiary to or resulting from the aforesaid objects, or from the construction or operation of the invention as it may be carried into effect, will become apparent as the said invention is hereinafter further disclosed.

Generally speaking, I may accomplish my objects by the provision in a motor vehicle of a chassis frame the forward end of which is mounted on the front axle of the vehicle, and carries the engine and other equipment usually supported thereby, and the rear end of which is raised to pass over a transmission housing the forward end of which is yieldingly suspended from said frame, the said rear end of the frame being mounted on the rear axle and carrying means for the attachment of a trailer thereto. All of which is more particularly described and ascertained hereinafter, by way of example, having reference to the accompanying drawings, wherein:—

Figure 1 is an elevation of a motor vehicle embodying the said invention;

Figure 2 is a plan of the same, the cab being omitted, and

Figure 3 is a transverse section taken on the line 3ˣ—3ˣ, Figure 2.

Similar characters of reference indicate similar parts in the several figures of the drawings.

In this example 1 is the chassis frame comprising an upper rear part 2 and a forward dropped part 3 connected together at their adjacent ends by upright members 4, the forward part 3 supporting the engine 5 by virtue of abutments 6 entering an extension 7 of a casting 8 attached to the crank case 9 of the said engine and shafts 10 entering the ends 11 of a yoke 12 on the forward end of the engine, the said front part of the frame being mounted upon the axle 13 of the front wheels 14 and the rear part upon the axle 15 of the rear wheels 16.

The said rear and raised part 2 of the chassis frame is shown as forming the support for the fifth wheel 17 upon which the forward end of a trailer (part of which is shown in dotted lines) may be rotatably supported and secured to the shackle or coupling member 18, the weight of the forward end of the said trailer being supported by the said rear part 2 of the said chassis frame.

19 indicates the transmission housing, and ordinarily the primary effort hereinbefore referred to will be transmitted through the frame to the front axle when the said housing is directly mounted in the frame and thereby associated with the front axle in the manner heretofore commonly employed. By my improved construction I suspend the forward end of the said housing from the frame by providing such forward end with a casting 20 having laterally projecting arms 21 which are carried by bolts 25 in the manner shown in the drawings wherein 24 are angle pieces carried by the said uprights 4 and interposed between the springs 22 and 23 the said bolts 25 extending upwardly through the arms, springs and angle pieces and provided at their upper ends with stop nuts 26 resting upon the upper springs 22.

As will be readily apparent, this suspension permits the vertical movement of the forward end of the housing with respect to the frame so that on the said primary effort becoming active this movement will result and the force thereof be absorbed in or damped by the said springs 23, thus preventing transmission of such motion through the frame to the front axle in such manner or to such extent as to effect the aforesaid undesirable lifting thereof. The springs 22 take care of the reaction of the springs 23 and assist in retaining the said housing in its normal position.

It will also be seen that, due also to the presence of the springs 27, there is no rigid connection between the said housing and the said frame so that the rear end of the said frame is resiliently floated with respect to the rear axle and with respect to the transmission housing, a trailer attachment or load secured to or upon the rear part of the frame being therefore similarly floated with respect to the said rear axle and transmission housing and the weight resulting therefrom, even though upon the rear end of the chassis frame, does not increase the tendency of the said primary effort to lift the forward end of the vehicle due to the fact that the damping effect of the forward transmission housing suspension is equally sufficient under such weighted conditions of the chassis frame.

28 and 29 indicate flexible couplings in the shaft 30 permitting the uninterrupted actuation of the rear housing in the manner described.

A motor haulage vehicle constructed along the lines suggested is entirely free from the objectionable features referred to and found in many such vehicles constructed as heretofore, and particularly in those equipped with high powered motors, and is consequently capable of being loaded to a greater extent about the rear axle without aggravating or bringing about such tendency, with the result that a greater general efficiency in the vehicle is secured.

This invention may be developed within the scope of the appended claims without departing from the essential features of the said invention, and it is desired that the specification and drawings may be read as being merely illustrative and not in a limiting sense except as necessitated by the prior art.

What I claim is:

1. Means for increasing the wheel base of a Fordson tractor by separating the front axle assembly from the rear axle assembly at the connection of the transmission housing with the engine block, said means including a rear frame part over the rear axle assembly, a front frame part extending rearwardly from the front axle assembly in a plane below that of the rear frame part, a rigid connection between adjacent ends of said front and rear frame parts, an operative power connection between the tractor engine and the rear axle assembly and yieldable means supporting the disconnected transmission housing relative to said rigid connection.

2. Means for increasing the wheel base of a Fordson tractor as called for in claim 1, wherein said yieldable means includes damping springs adapted to resist upward movement of the forward end of the tractor transmission housing.

3. In a tractor trailer combination wherein the rear end of a tractor extends under the forward end of a trailer, and wherein a comparatively short tractor is adapted to have its wheel base lengthened to prevent a tractor load from raising the front end of the tractor from the ground, means for increasing the wheel base of the short tractor by separating parts thereof, said means including a frame supporting forward parts of the tractor and extending rearwardly to support the forward end of the trailer over the rear parts of the tractor, said frame including portions placing the rear part of said frame at a greater elevation, than the front part of said frame, and a yieldable connection between said frame and rear tractor parts.

In testimony whereof I affix my signature.

SIDNEY B. WINN.